United States Patent [19]

Spink et al.

[11] Patent Number: 4,778,520

[45] Date of Patent: Oct. 18, 1988

[54] PROCESS FOR LEACHING ZINC FROM PARTIALLY DESULFURIZED ZINC CONCENTRATES BY SULFURIC ACID

[75] Inventors: Donald R. Spink, Waterloo; Jerry Y. Stein, Thornhill, both of Canada

[73] Assignee: University of Waterloo, Waterloo, Canada

[21] Appl. No.: 30,114

[22] Filed: Mar. 26, 1987

[51] Int. Cl.[4] .............................................. C22B 19/00
[52] U.S. Cl. ....................................... 75/120; 75/2; 75/9; 75/101 R; 75/101 BE; 75/108; 75/121; 423/100; 423/101; 423/109; 423/110; 423/139; 423/140; 423/150; 423/153; 204/112; 204/118
[58] Field of Search .................... 423/47, 27, 153, 150, 423/110, 100, 140, 101, 109, 139; 75/2, 6, 7, 9, 101 R, 101 BE, 108, 117, 119, 120, 121; 204/112, 118

[56] References Cited

U.S. PATENT DOCUMENTS 4,124,462 11/1978 Reinhardt et al. .................. 423/109
4,552,629 11/1985 Duyoesteyn et al. ............... 423/100

FOREIGN PATENT DOCUMENTS 1199506 8/1965 Fed. Rep. of Germany .

Primary Examiner—Robert L. Stoll
Attorney, Agent, or Firm—Sim & McBurney

[57] ABSTRACT

A process comprises leaching zinc oxide either separately or in conjunction with iron oxides from a partially desulfurized zinc bearing sulfide ore of concentrate. The ore is pretreated to eliminate in a controlled manner sulfur-sulfur-sulfide in the ore yet leaving sufficient residual sulfur-sulfide in the material such that iron values are maintained substantially wholly in the ferrous state, while converting zinc sulfide to zinc oxide without formation of FeO-ZnO complexes. The partially desulfurized material may be selectively leached with a sulfuric acid containing solution under neutral leach conditions to dissolve thereby preferentially the zinc oxide over the iron oxide. Alternatively the material may be leached with a higher concentration of sulfuric acid containing solution to dissolve preferentially zinc oxide and iron oxide simultaneously. The leach liquor may be subsequently treated to electrolytically remove zinc.

36 Claims, 4 Drawing Sheets

PROCESS FOR LEACHING ZINC FROM PARTIALLY DESULFURIZED ZINC CONCENTRATES BY SULFURIC ACID

FIELD OF THE INVENTION

This invention relates to the hydrometallurgical treatment of partially desulfurized zinc concentrate containing iron substantially wholly in its ferrous state and to the use of zinc electrolyte (sometimes referred to in the art as spent acid or depleted electrolyte) or aqueous solution of sulfuric acid in a sequence of processing steps which are so arranged, coordinated and operated that the major oxidic constituents of the above oxide-sulfide material, particularly zinc and iron oxides, are effectively separated either simultaneously or sequentially from the content of the material in a highly economical manner to effect zinc recoveries in excess of 98%.

BACKGROUND OF THE INVENTION

In the zinc industry one of the most challenging problems is the avoidance of the formation of zinc ferrite and zinc sulfate during roasting with the production of high grade calcine from iron-bearing zinc sulfide concentrate, typically assaying about 50 to 55% Zn, 2 to 17% Fe, 0.02 to 1% Cu, 0.1 to 0.3% Cd and less than 2% Pb, so that it is not essential (1) to carry out a zinc plant residue treatment in order to extract the significant quantities of the zinc combined as zinc ferrite normally left uneffected by calcine neutral leach operations presently practised, and (2) to bleed off the system in order to maintain the sulfate balance unchanged.

The zinc ferrite problem stems from the presence of iron in the concentrate feed. Zinc oxide and ferric oxide react with each other at elevated temperatures (about 600° C.) to form very stable zinc ferrite spinels ($ZnO \cdot Fe_2O_3$). This occurs whether the iron is in solid solution in the zinc sulfide concentrate or is present in a separate iron phase. The loss of zinc due to insoluble zinc ferrites is represented in the industry as the ferritization ratio, defined as the weight of zinc rendered insoluble by a unit weight of iron and generally reported to be about 0.5 to 0.53. During roasting at temperatures above 900° C., some of the iron remains as hematite but most of this combines with zinc oxide to form zinc ferrite. The lack of solubility of ferrites means that the solids residue remaining after a neutral sulfuric acid leach contains a significant concentration of zinc which, if no steps were taken to recover it, would represent a loss to the process and significantly affect the overall efficiency of the process.

A further complication is introduced by the presence of sulfate in the calcine. Zinc sulfate is soluble in leach liquor, but the ratio of zinc oxide to sulfate in the calcine is limited by requirements of the leaching and electrolytic circuits owing to its conversion to sulfuric acid upon electrolysis. Generally, should the sulfate content of the calcine exceed a limit of about 2%, purging of the leach liquor would be required to prevent build up of acid in the system, also entailing a loss in zinc yield.

From the foregoing it is evident that the quality of zinc calcine for use in hydrometallurgical processes is complicated by the presence of zinc ferrite and zinc sulfate and reflects itself materially in the operation of the hydrometallurgical process. Obviously, therefore, a process which would obtain complete avoidance of the formation of both zinc ferrite and zinc sulfate would represent a marked improvement and breakthrough in the art.

These prior art problems are now overcome with the development of an effective partial desulfurization roasting technique that avoids the formation of ferrites and sulfates, and a downstream leach processing technique which allows oxide-sulfide mineral treatment to be readily combined, thus making possible the production of high quality calcine for use in hydrometallurgical processes without entailing practically any loss of zinc yield except for an anticipated small bleed off stream for maintaining the heavy metal impurity concentration in balance in the process circuits.

The partial desulfurization of iron-bearing metal sulfide ores or concentrates is described in detail in our copending U.S. patent application Ser. No. 829,927 filed Feb. 18, 1986. As described therein, iron-bearing metal sulfide ores or concentrates, particularly zinc sulfide concentrates, are treated to produce a partially desulfurized concentrate characterized by extremely low, if any, zinc ferrite and zinc sulfate contents. This process comprises passing a concentrate in contact with an oxidizing gas and controlling the residence time to effect a specific degree of sulfur elimination at a temperature below the sintering temperature of the concentrate, thereby retaining a sufficient amount of residual sulfide-sulfur in the partially-desulfurized concentrate throughout the roast to effect a selective oxidation of iron sulfide content in the concentrate to an acid-leachable iron compound in which iron is maintained substantially wholly in the ferrous state, and the conversion of a portion of the zinc sulfide content in the concentrate to zinc oxide, thereby producing a quality partially desulfurized concentrate for economical hydrometallurgical treatment to recover the zinc metal values therefrom.

By the practice of the process of our copending application, it is possible (1) to avoid the formation of zinc ferrites, (2) to avoid the formation of zinc sulfates, (3) to produce a very active calcine, and (4) to concomitantly produce a very high strength $SO_2$-laden off-gas substantially free of oxygen and suitable for economical production of sulfuric acid. Furthermore, it is possible by the practice of the above process to employ a much smaller and more compact roaster than the commercially-available ones for the same given capacities, or alternatively, to employ higher throughputs in existing roasters, as much shorter residence times are required to effect such a partial roast.

The invention is directed to a method for hydrometallurgical treatment of partially-desulfurized zinc concentrates containing iron substantially wholly in its ferrous state for the recovery of the free zinc values therefrom which, when coupled with the partial-desulfurization method, constitutes a much simpler, more efficient and commercially more economical process than the currently-existing 'dead' roast-leach-electrowin process.

SUMMARY OF THE INVENTION

According to an aspect of the invention, a process for leaching zinc oxide from a partially desulfurized zinc bearing sulfide material containing iron sulfide and oxides comprises selectively leaching the material with a sulfuric acid containing solution under neutral leach conditions. Such leaching dissolves preferentially the zinc oxide over the iron oxides.

According to another aspect of the invention, a process for leaching zinc oxide and iron oxides from a partially desulfurized zinc bearing sulfide material is provided, the material is an iron containing zinc sulfide ore or concentrate prepared by contacting the ore or concentrate at a temperature below sintering temperature of the ore or concentrate with an oxidizing gas to eliminate in a controlled manner between 60 percent to 77 percent of sulfur-sulfide in the ore or concentrate. A sufficient residual sulfur-sulfide remains in the material such that iron values are maintained substantially wholly in ferrous state and zinc sulfide is converted to zinc oxide without formation of FeO-ZnO complexes.

BRIEF DESCRIPTION OF THE DRAWINGS

In the following detailed description of the invention, reference is made to the accompanying drawings, in which.

DETAILED DESCRIPTION OF THE PREFERRED EMBODIMENTS

Figure 1:
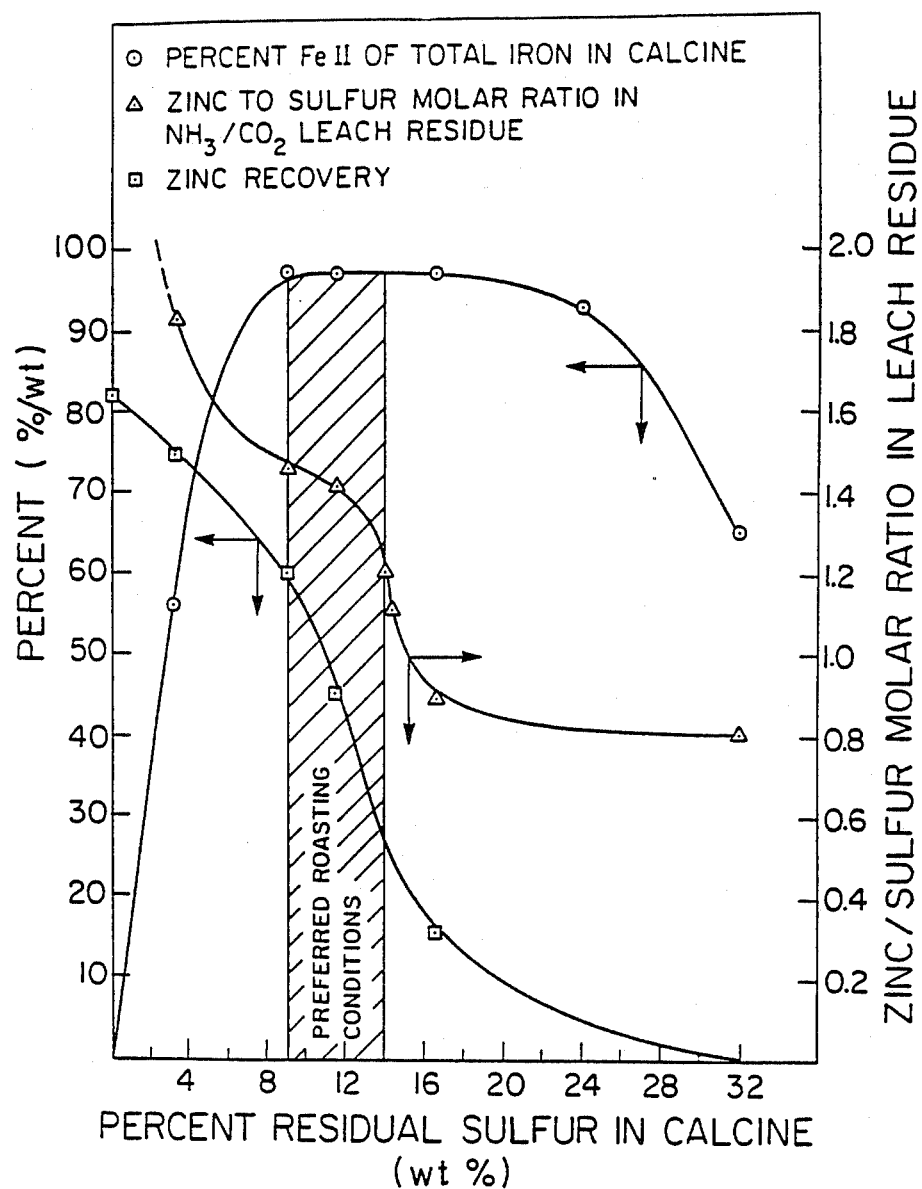
FIG. 1 is a graphical representation of the variation of percent iron in the ferrous form in the calcine, the variation of zinc to sulfur molar ratio in the leach residue and the variation of zinc recovery with residual sulfur in the calcine for a zinc concentrate roast.

According to currently-employed practices, zinc sulfide concentrates containing primarily zinc and iron are given a 'dead' oxidizing roast, thereby producing an $SO_2$-laden gas contaminated with oxgen and a calcine containing zinc oxide values with appreciable amounts of ferrites and sulfates. The calcine is then leached with the majority of the spent electrolyte from a zinc electrowinning procedure to form an aqueous electrolytic solution of zinc sulfate, in such a way that the zinc ferrite contained in the calcine is not attacked by the sulfuric acid content of the spent electrolyte to any substantial extent (i.e. so-called "neutral" leach conditions), with the result that the leach solution contains a minimum quantity of dissolved iron. The residue containing zinc ferrite is then separated from the solution and further subjected to a second leach with hot (about 95° to 100° C.), more concentrated sulfuric acid (more than 100 g/L $H_2SO_4$) to improve the extraction of zinc by liberating the zinc in the ferrite, thus achieving an acceptable overall recovery of zinc from the calcine. The problem with such a process is that the associated iron values are also largely dissolved and must subsequently be precipitated in an easily-filtered form prior to zinc electrolysis. The development of the Jarosite and Goethite processes has made it possible to remove the high concentration of iron from zinc sulfate solutions in readily separated crystalline forms. However, while this has allowed the recovery of zinc from zinc ferrite, the above iron precipitation methods have also proved to be costly. Additionally, the results of much more intensive conditions of acidity, leach duration and elevated temperature that are used during hot acid leaching of residue is that additional quantities of impurities enter into the solution. These additional quantities of impurities must be removed from solutions or electrolysis will be effected adversely. This requires an extension of previously existing procedures for purification of solutions from harmful impurities, such as cobalt, manganese, nickel and fluoride, etc.

The improvement contemplated by the present invention is particularly applicable in the electrolytic process for the recovery of zinc from its concentrates, in which a zinc sulfide concentrate is only partially desulfurized in a controlled oxidizing atmosphere to convert a portion of the zinc sulfide to zinc oxide while still leaving sufficient sulfide sulfur in the concentrate to act as a reducing reservoir in maintaining the iron substantially wholly in its ferrous state. This step is defined in detail in the aforementioned United States patent application. In the second step, the resulting partially-desulfurized concentrate, primarily having residual zinc sulfide sulfur, zinc oxide and iron oxide values, are treated with depleted electrolyte or sulfuric acid under mild conditions to recover the zinc and iron values in oxide form from the partially-desulfurized product while retaining zinc and other base metal values in sulfide form in the residue for recycle to the roasting step. This treatment of the partially-desulfurized zinc concentrate by spent electrolyte to remove zinc oxide values and ferrous oxide may be effected simultaneously or sequentially depending on the level of the residual sulfide sulfur retained in the partially-desulfurized zinc concentrate and on the degree to which iron is complexed to the zinc. The residual zinc sulfide after separation may be recycled to the roasting circuit.

The process of the invention may reasonably lead to zinc recoveries approaching 98% and more. The iron dissolved in the leach liquor may be precipitated rather easily, either for disposal or as a feed material for the steel industry using conventional techniques.

While complete avoidance of zinc ferrite can be realized in a partial-desulfurization roasting process, the formation of wustite-zincite complexes occurs to some extent, depending on the degree to which sulfur is eliminated from the concentrate. For example, up to a degree of sulfur elimination of 50 to 60% (some 16.5 wt% residual sulfide sulfur in the partially-desulfurized zinc concentrate) very little, if any, formation of such complexes occurs. The degree of sulfur elimination, which is also the percentage of original sulfur eliminated, is defined as $$1 - \frac{\% \text{ S in the partially-desulfurized concentrate} \times \% \text{ Fe in the feed}}{\% \text{ S in the feed} \times \% \text{ Fe in the partially-desulfurized concentrate}}$$

In this example, the removal of zinc oxide and iron oxide may be effected sequentially. At a higher degree of sulfur elimination, up to some 77% (corresponding to a residual sulfide-sulfur content of some 8 to 9% S), the formation of the above wustite-zincite complexes become pronounced and progressively increasing with further eliminatiion of sulfide sulfur. In this range of the partial desulfurization spectrum, the removal of zinc oxide and iron oxide from the partially-desulfurized zinc concentrate may be effected simultaneously. Beyond 77% sulfur elimination, a noticeable oxidation of ferrous iron to ferric iron begins and progressively proceeds nearly to completion with sulfur being further eliminated beyond this level from the concentrate, thus most likely forming zinc ferrite, in which the ferric state of iron is required and which is insoluble in dilute acids.

The influence of the residual sulfide sulfur in the partially desulfurized zinc concentrate on the leachability and the formation of wustite-zincite complexes is best illustrated in FIG. 1. The lixiviant used to produce the results depicted in this figure was ammoniacal ammonium carbonate solution in which wustite-zincite complexes or zinc ferrite spinels are not soluble, but the relationships depicted therein also apply for other lixiviants which selectively dissolve the oxide values in preference to the sulfide values. FIG. 1 shows the influence of the degree of sulfur elimination, i.e. percent residual sulfur in the calcine, on variables, such as zinc-to-sulfur molar ratio in the resultant leach residue and the overall free zinc oxide recovery by leaching the partially-desulfurized concentrates in an $NH_3/CO_2$ medium. The leaching of the partially-desulfurized concentrate was effected at about 40° C. for about 30 mins using ammoniacal ammonium carbonate having a pH 11.5 at a solids loading of about 80 g/L.

The data shown in FIG. 1 shows that the Zn/S molar ratio is dependent on the sulfide-sulfur content in the leach residue. Up to a degree of sulfur elimination of some 60% (i.e. 16.5 wt% residual sulfur), the Zn/S ratio was only slightly dependent on the residual sulfur remaining in the calcine, with the Zn/S ratios varying from 0.8 to 0.9. Bringing this ratio lower than 10 implies that over this range of the partial-desulfurization spectrum, the zinc sulfide and other metal impurity sulfides were likely progressively oxidized to their respective free oxides without forming insoluble complexes. Of importance in this range is the fact that ferric iron, which was initially also present in the calcine as ferric iron, was gradually reduced to ferrous iron, reaching nearly complete reduction when the residual sulfur in the calcine dropped to some 20 wt% S (corresponding to a degree of sulfur elimination of some 45%). To effect such a degree of sulfur elimination, a residence time longer than some 25 min. was required to completely reduce the ferric iron to ferrous iron and to maintain substantially the entire iron content of the calcine in the ferrous state. The maximum zinc recovery from the starting concentrate achievable in this range of the partial oxidation spectrum was fairly low, at only about 15% to 20% zinc, when using the $NH_3/CO_2$ as the leaching medium.

The results of FIG. 1 further reveal that at a higher degree of sulfur elimination, corresponding to a residual sulfur less than 17 wt% S, the Zn/S ratio in the leach residue exhibits a strong dependence on the degree of sulfur elimination, rapidly increasing from 0.9 at residual sulfur of some 17 wt% S, to a ratio of 1.5 at residual sulfur of 9 wt% S. Over this range the entire iron was maintained practically as ferrous iron. The higher Zn/S ratio obtained over this range of the partial desulfurization spectrum is indicative of incomplete recovery of the oxidized zinc sulfide (ZnO) values from the calcine. The insolubility of a portion of the oxidized zinc sulfide in the $NH_3/CO_2$ leach medium is attributable to the formation of $NH_3/CO_2$-insoluble, wustite-zincite complexes (Zn.Fe)O. However, these complexes, while being insoluble in the $NH_3/CO_2$ medium, are rather soluble in dilute acidic media. Complete avoidance of the formation of these complexes may be achieved at a lower degree of sulfur elimination (some 50%), but this would result in a fairly low zinc recovery of only some 15% Zn in a single pass, as indicated by FIG. 1. The relatively high solubility of the ferrous zincite complexes in acidic media clearly indicates the desirability of operating the roaster in this range of the partial desulfurization spectrum. Further, the results of the leaching experiments depicted in FIG. 1 deomonstrate that the overall zinc recovery was nearly linearly proportional to the degree of sulfur elimination over the above partial oxidation range, varying from some 15% zinc recovery from a calcine with residual sulfur of 16 wt% to some 60% zinc recovery from a calcine with residual sulfur of 9 wt% (degree of sulfur elimination 77%).

At a higher degree of sulfur elimination than 77% (corresponding to a residual sulfur less than 9 wt% S), a noticeable oxidation of ferrous iron to ferric began and progressively proceeded nearly to completion with decreasing sulfide-sulfur content in the calcine to a level less than 0.5 wt% S. As shown in FIG. 1, the presence of ferric iron in the calcine had a pronounced effect on the Zn/S ratio in the leach residue. Over the range where oxidation of ferrous iron to ferric iron takes place, the Zn/S ratio was very strongly dependent on the degree of sulfur elimination, increasing exponentially to a Zn/S ratio of 1.9 when the employed calcine contained some 3.2 wt% S (degree of sulfur elimination of 92%). The Zn/S ratio of 1.9 indicates that, at this level of sulfur elimination, for each mole of zinc sulfide present in the residue, there is also some 0.9 mole of zinc oxide which is insoluble in $NH_3/CO_2$ medium. The high zinc to sulfur ratios obtained over this range of the partial oxidation spectrum is attributable to a shift in composition from wustite-zincite complexes (Zn.Fe)O to zinc ferrite ($ZnFe_2O_4$). The flatter segment of the zinc recovery curve for residual sulfur lower than 9 wt% S is also indicative of concomitant zinc ferrite formation. As may be seen, the maximum zinc recovery from a 'dead' roasted Kidd Creek calcine A was only 83%. This low recovery of zinc is attributed to the presence of acid insoluble zinc ferrites.

As the results of FIG. 1 show, the only way to achieve a complete avoidance of iron spinel formation was to control the roasting conditions in a way such that the sulfide-sulfur level in the calcine bed is controlled at a level not lower than, say, 9 wt% S for the KCCA feed concentrate tested, thus producing a calcine with essentially all the contained iron as ferrous. The formation of wustite-zincite complexes is not a major problem as these complexes are not as stable as the zinc ferrites and can be easily dissolved in dilute acidic media.

As observed, the most important factor to ensure success when partially roasting zinc concentrates is the residence time (degree of sulfur elimination). The experiments reported in FIG. 1 have shown that the zinc-to-sulfur ratio in the $NH_3/CO_2$ leach residue increased substantially only when the degree of sulfur elimination was higher than some 60%. At this degree of sulfur elimination, only 15 to 20% once through recovery of zinc was achievable, without any recycle of residual zinc sulfide. From a practical point of view, satisfactory zinc recovery results were not obtainable, until a degree of sulfur elimination of some 77% was achieved, resulting in some 60% zinc recovery. Nevertheless, 15 to 20% zinc recovery in a continuously cycling process while avoiding the formation of ferrous zincite may well prove to be the most efficient way to operate some systems. Larger scale optimization studies would be required to determine the most appropriate manner in which to operate with each specific concentrate. Although a continued increase in the degree of sulfur elimination gave still better zinc recoveries, the high propensity of ferrous iron oxidized to ferric iron, thus forming the acid/alkaline insoluble zinc ferrites above those levels, limits the ability to further increase the degree of sulfur elimination. To render the partial roast-sulfuric acid leach process successful, the preferred range of residual sulfur to be retained in the partially-desulfurized Kidd Creek zinc concentrate A calcine was determined to be 9 to 14 wt% S.

The invention is now described in more detail with respect to the specific embodiment of treatment of a partially-desulfurized zinc concentrate with dilute sulfuric acid or zinc electrolyte.

As seen in the foregoing discussion, the formation of wustite-zincite complexes depends on the degree of sulfur elimination. Where the degree of sulfur elimination is limited to some 60% and, therefore, the partially-desulfurized zinc concentrate contains virtually no wustite-zincite complexes, the partially-desulfurized zinc concentrate may be sulfuric acid leached under neutral leach conditions to recover the soluble zinc in preference to the unreacted zinc sulfide and iron oxide values which remain in the solid leach residue, followed by leaching with dilute sulfuric acid under more intensified leach conditions to selectively dissolve the ferrous oxide from the zinc sulfide-bearing leach residue. The zinc-sulfide bearing residue remaining after the dilute acid leach may be either oxygen pressure leached or recycled to the roasting circuit. In order to achieve satisfactory dissolution of the free zinc with minimum dissolution of the ferrous iron under this scenario in the neutral leach process, it is advisable to leach the partially desulfurized zinc concentrate in a number of consecutive stages. The first stage is preferably controlled at from 10 to 20 g/L sulfuric acid for no longer than 5 to 10 minutes to minimize ferrous iron dissolution and maximize free zinc dissolution. The other stages, generally between two to three, are designed to bring the pH of the pulp to a level from 4 to 4.5 so that the solution is purified from dissolved ferrous iron. Oxygen bearing gas or other suitable oxidants may be injected into the solution to eliminate ferrous iron dissolved primarily during the first stage. The pH must be brought up slowly, due to the slower neutralization effects of the partially desulfurized zinc concentrate as the pH increases, and the propensity of the concentrate to form a "donut" at the bottom of the leaching vessel. The rate of addition of the partially desulfurized zinc concentrate to the subsequent stages preferably is made over a period in the range of 1 to 3 hours. It is noteworthy that if the addition of the partially desulfurized concentrate is made too rapidly, excess heating of the leach liquor can ensue, causing excessive evaporation and foaming. The temperature is preferably kept at 85° to 95° C. throughout. The residue resulting from the neutral leach process contains most of the iron as ferrous. The zinc is present substantially wholly as zinc sulfide. To extract the iron, a more vigorous leaching, to be conducted under dilute sulfuric acid conditions, is necessary. Through experimentation, it was discovered that in order to achieve satisfactory dissolution of the iron, the concentration of sulfuric acid should not be below 10 g/L. In practice, it was found that sulfuric acid concentration of from 15 to 40 is sufficient to ensure rapid dissolution of the iron without dissolving the sulfide portion of the residue. This preferred range of sulfuric acid concentration is yet substantially lower than the concentration of sulfuric acid required to effectively dissolve zinc ferrite. The likelihood of operating the iron removal leaching step under much milder conditions causes less problems as reduced number of impurities present in the residue become dissolved, decreasing thus the burden of purification and goethite disposal. The temperature in the dilute leach process is kept preferably at 80 to 95 throughout. The solution, now containing most of the dissolved iron in the ferrous state due to the presence of undigested zinc sulfide which act as a reducing agent passes next, after being separated from the residue to a conventional goethite precipitation stage. Here, neutralizing agents such as dead calcine is added to control the acidity and air is injected to oxidize the ferrous iron. As the ferrous iron is oxidized to the ferric state, it is hydrolyzed and precipitated as crystalline goethite which is substantially separated from the solution and disposed. The solution is returned to the neutral leach stage. It is noteworthy that the maximum once-through free zinc recovery achievable in this range of up to 60% degree of sulfur elimination is fairly low at only about 15 to 20% zinc. From a practical point of view though, this recovery may not represent a satisfactory once-through zinc recovery, it may well prove to be still acceptable in a continuously cyclic process due to the formation of negligible wustite-zincite complexes in this range of the partial-desulfurization spectrum.

Where the degree of sulfur elimination effected is higher than 60% but lower than some 77% and consequently the partially-desulfurized concentrate contains appreciable amounts of wustite-zincite complexes, the removal of the above complexes, along with the free zinc oxide and iron oxide values, may be effected simultaneously by leaching with dilute sulfuric acid under conditions described before without affecting the residual zinc sulfide content of the residue, which may subsequently be either recycled to the roasting circuit or oxygen pressure leached to improve the overall zinc yield to greater than 98%.

Depending on the degree of sulfur elimination established in the above range, between 20 to 70% of the zinc in the partially-desulfurized zinc concentrate is readily dissolved in dilute sulfuric acid medium. The associated iron values largely dissolved with the zinc can then be selectively precipitated in an easily-filtered form, prior to zinc electrolysis, by a straightforward oxidation of the ferrous iron (under neutralizing conditions). In both embodiments, since the residual zinc sulfide residue may be returned to the roasting circuit, the iron content of this recycled product need not be any lower than the iron content of the original concentrate feed to the roaster. For example, if 20% of the zinc were leached from the partially-desulfurized concentrate, only 20% of the iron need be removed to maintain a consistent Zn/Fe feed to the roaster.

In accordance with the first embodiment, there is provided a process for extracting zinc from partially-desulfurized zinc concentrate containing primarily zinc sulfide, zinc oxide, ferrous oxide and other impurities, especially copper, lead, cadmium, chromium cobalt, nickel, manganese, magnesium, calcium, arsenic and fluoride, which comprises:

(a) Partially desulfurizing zinc sulfide concentrates to effect a degree of sulfur elimination of no more than 60%, thereby converting a small portion of zinc sulfide to zinc oxide in a controlled manner under which the iron sulfide content of the zinc concentrate is selectively converted to substantially wholly ferrous oxide and maintained so throughout the roast with practically complete avoidance of wustite-zincite complexes formation.

(b) Selectively leaching the partially-desulfurized concentrate with zinc electrolyte or aqueous solution of sulfuric acid under neutral leach conditions at elevated leach temperatures to preferentially dissolve the free zinc oxide values over iron followed by oxidation to precipitate small amounts of dissolved iron and to produce (1) an electrolytic leach solution containing zinc values, low concentration of metal impurities and extremely low iron concentrations, and (2) a leach residue containing zinc and other non-ferrous sulfides and iron oxide in which iron is present primarily in its ferrous state. Because conditions at the end of the leach are such as to promote oxidation of dissolved ferrous iron and hydrolysis of the resultant ferric iron to form hydrous precipitate, virtually all of the iron will report to the leach residue.

(c) Separating the leach liquor from the residue to produce a final leach liquor containing the desired zinc values but containing very little iron derived from the ferrous iron in the partially-desulfurized concentrate. The solution is initially purified to remove certain deleterious impurities and then is electrolyzed to produce metallic zinc, using an insoluble anode.

(d) Treating the resulting zince sulfide- and iron oxide-bearing leach residues from step (c) with dilute sulfuric acid to dissolve iron oxide selectively over zinc sulfide to a degree suitable for recycling of the iron-depleted zinc sulfide residue to the roaster for re-use. To avoid build-up of the impurity base metal/heavy metal sulfides in the circuit, the recycled zinc sulfide stream can either be floated to separately recover the more easily floated sulfides, prior to recovering the undigested zinc sulfide, or a small portion of the recycle stream can be bled off to keep the level of impurities of base and heavy metal in balance in the process circuit. Alternatively, the zinc sulfide bearing residue can be oxygen pressure leached with the resultant residue being further smelted to receover lead and silver values and the pressure leach solution being passed to step (d).

(e) Neutralizing, heating and concomitantly oxidizing the ferrous iron bearing solution from step (c) to precipitate the iron as goethite. The precipitated iron bearing compound can either be discarded or marketed for the steel industry.

Figure 2:
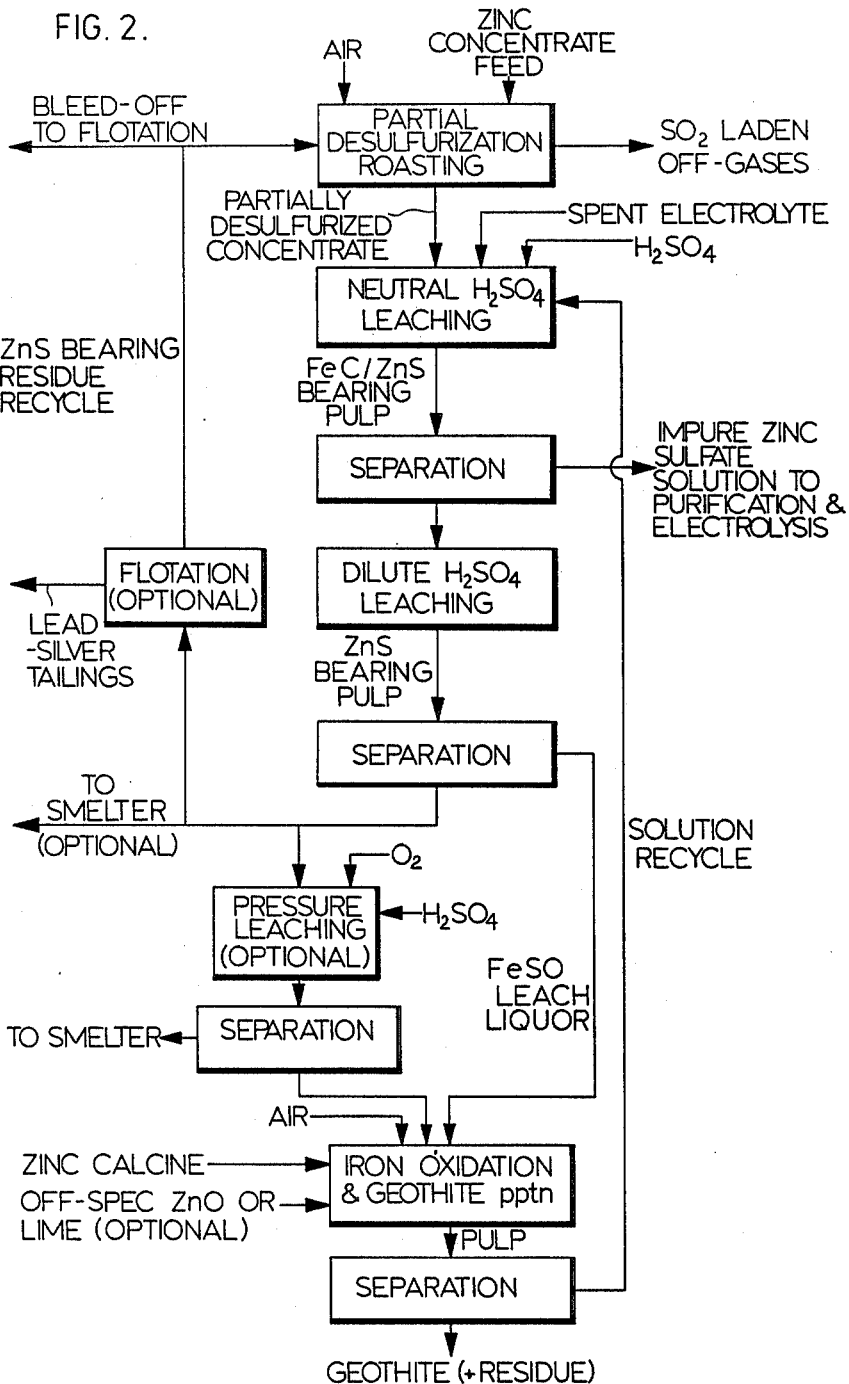
FIG. 2 is a schematic flow sheet of one embodiment of the process of the invention wherein a partially-desulfurized zinc concentrate, containing iron substantially wholly in the ferrous state in the form of wustite, is sequentially treated with sulfuric acid under differing conditions to separate zinc oxide and ferrous iron oxide values respectively therefrom.

This embodiment of the invention is illustrated in flow sheet form in FIG. 2.

In accordance with the second embodiment which is also the currently-preferred mode of operation, there is provided a process, which comprises:

(a) Partially desulfurizing zinc sulfide concentrates to effect a degree of sulfur elimination of more than 60% but no more than 77%, thereby leaving a sufficient amount of residual sulfur in the partially-desulfurized zinc concentrate to effect a selective oxidation of iron sulfide content in the concentrate to an acid leachable iron compound in which iron is maintained substantially wholly in the ferrous state, in the form of ferrous oxide and wustite-zincite complexes.

(b) Leaching the partially-desulfurized concentrate with dilute zinc electrolyte or dilute aqueous solution of sulfuric acid (acid concentration preferably less than 40 g/L but more than 10 g/L) at elevated temperatures to dissolve the zinc oxide values and iron oxide values, both combined and uncombined, simultaneously.

In this embodiment, the iron may be removed from the partially-desulfurized concentrate only to a degree which is suitable for recycling of the iron-depleted zinc sulfide residue to the roaster for re-use, that is, the iron content of the admixture of this recycled residue and the partially-desulfurized concentrate neutralized residue resulting from the subsequent step (step (c)) need not be any lower than iron content of the original concentrate feed to the roaster. Alternatively, the iron depleted zinc sulfide residue emanating from step (c) may be oxygen pressure leached with the resultant solution being passed to the dilute leach stage, step (b).

(c) Pre-neutralizing the dilute leach pulp resulting from step (b) with partially-desulfurized zinc concentrate. Because the iron is in the ferrous state, hydrolysis will not take place provided oxygen is excluded from the system. Also, to minimize the use of a neutralizer during the subsequent iron precipitation step, the amount of partially-desulfurized concentrate added should be sufficient to neutralize as much as is practicable of the free acidity in the leach liquor before it enters the precipitation stage for removal of the soluble iron (pH 4.5 to 5.5). This means that more partially-desulfurized concentrate combined in this stage and the residue from this larger quantity of the partially-desulfurized zinc concentrate used for this pre-neutralization can be separated along with the leach residue resulting from step (b) and returned either to the partial desulfurization roasting step or to an oxygen pressure leaching step. The pre-neutralization step is also of major benefit in further concentrating the solution with respect to zinc values.

Because pre-neutralization allows undissolved residue to be conserved, it can also allow completion of the dilute acid leach stage in step (b) at higher temperature and acidity, which can result in faster leaching rates, particularly of those of iron and wustite-zincites complexes. In the absence of oxidizing conditions during the leach, the solution should contain all of the iron dissolved as ferrous sulfate, due to the presence of zinc sulfide solids in solution which should also minimize the tendency for hydrolysis to commence prematurely during the preneutralization stage, if the free acidity is decreased too far.

(d) Separating the iron-zinc bearing leach liquor from the admixture of leach residue and neutralizer residue to produce (1) a leach solution containing zinc and appreciable amounts of iron derived from the partially-desulfurized zinc concentrate and having an acid concentration of 10 to 40 gpl and (2) a leach residue containing zinc, other non-ferrous sulfide and iron in which iron is present primarily in its ferrous state. The latter being either recycled to the roaster for re-use or oxygen pressure leached. When recycling is the case, to avoid build-up of base and heavy metal sulfide impurities in the circuit, the recycled residue stream may either be floated to separately recover the more-easily floated sulfides prior to recovering the undigested zinc sulfide, or alternatively, a small portion of the the recycle stream may be bled off to keep the level of the above metal impurities in balance in the process circuit.

(e) Oxidizing the iron present in its ferrous state in the resultant iron/zinc bearing solution from step (d) to ferric at elevated temperatures with concomitant neutralization, to pH not less than 2.0. Since the solution that is separated after pre-neutralization has a high pH of some 5 to 5.5, neutralizing agent (partially desulfurized concentrate) that is to be added during precipitation of the iron to control the acidity generated during hydrolysis should be kept to a minimum to prevent its loss with the precipitated iron. It is found that, because of the high initial pH of the solution (pH=5.5), the majority of iron precipitation occurred before the pH drops below 2.0 owing to sulfuric acid being generated during the hydrolysis process. If necessary, it is possible to use a small scale flotation process stage to recover the partially-desulfurized zinc concentrate used as a neutralizer from the precipitated iron for re-use. The precipitated iron may be either discarded or marketed for the steel manufacturing industry. The resulting solution, practically free of iron, is initially purified to remove certain deleterious impurities and then is electrolyzed to produce metallic zinc.

Figure 3:
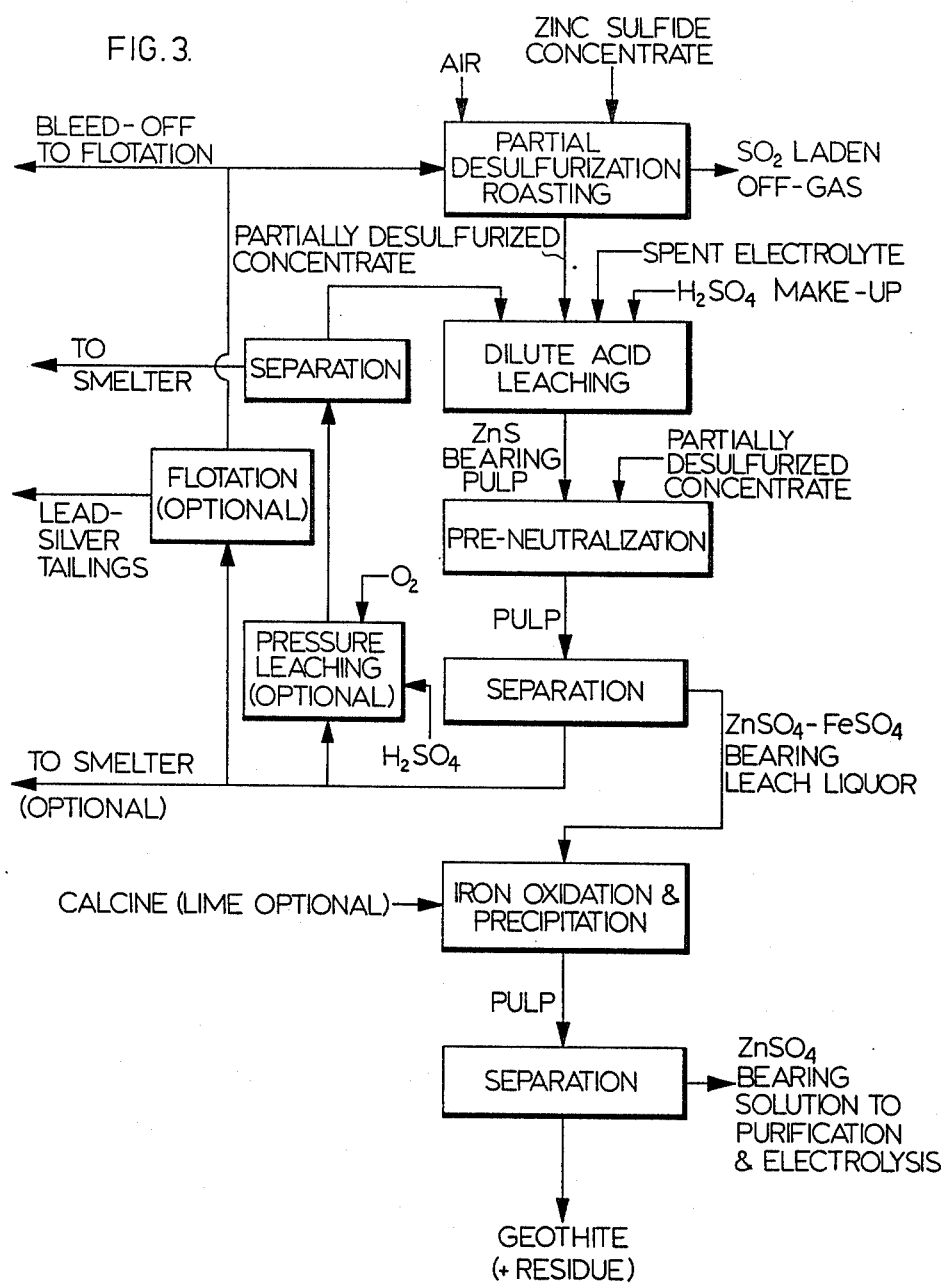
FIG. 3 is a schematic flow sheet of a second embodiment of the process of the invention wherein a partially-desulfurized zinc concentrate, containing iron substantially wholly in the ferrous state in the form of wustite and wustite-zincite complexes, is treated with sulphuric acid to separate the zinc oxide and ferrous iron oxide values simultaneously therefrom.

This embodiment of the invention is illustrated in flow sheet form in FIG. 3.

Figure 4:
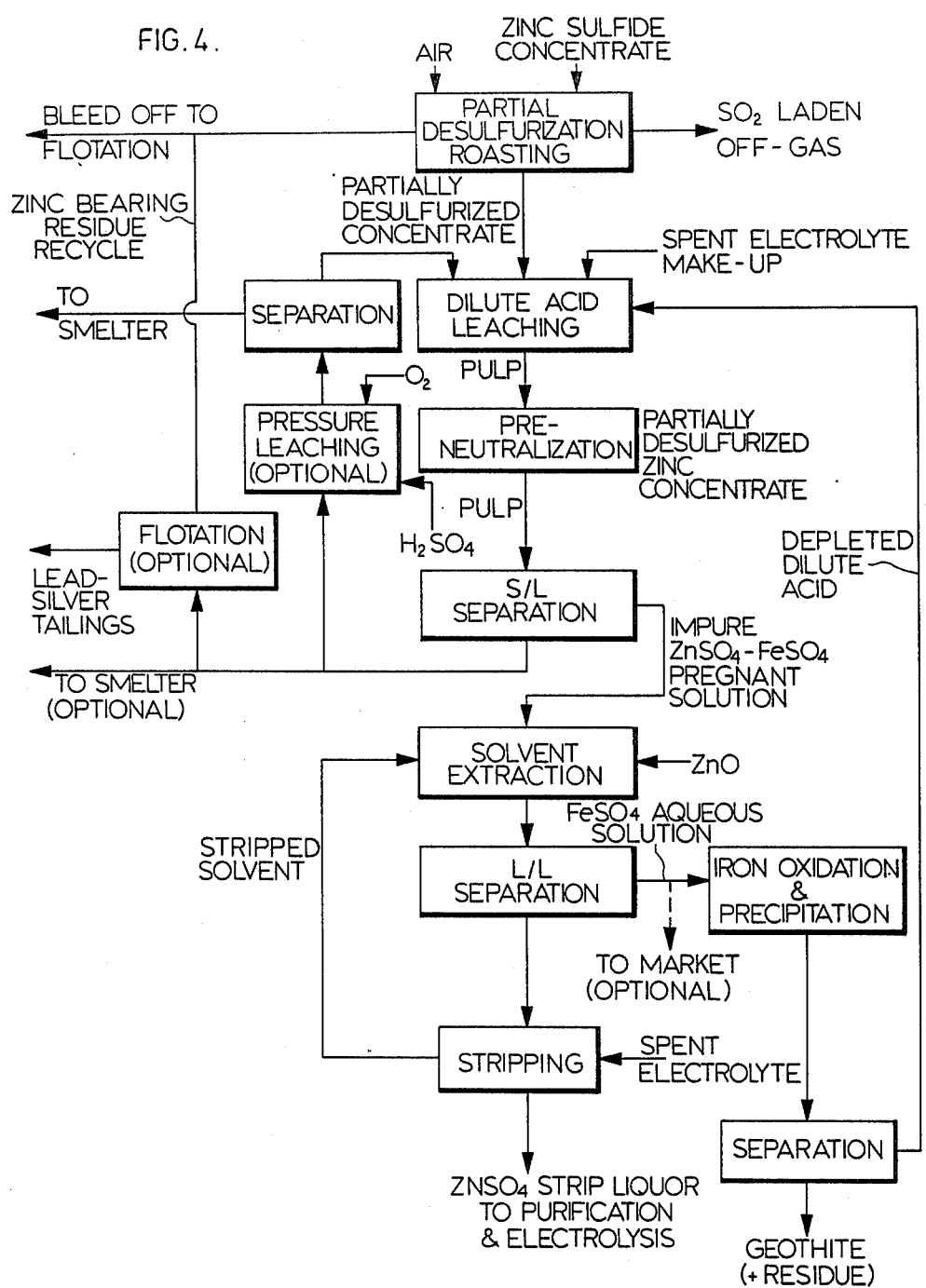
FIG. 4 is a schematic flow sheet of a third embodiment of the process of the invention wherein solvent extraction is employed in the recovery of zinc and iron values from a partially-desulfurized concentrate.

In a third embodiment illustrated in FIG. 4, the pregnant pulp containing the zinc and iron as sulfates and in which the iron is present substantially wholly in its ferrous state is processed under non-oxidizing atmosphere to separate the unleached residue containing primarily zinc sulfide for either recycle to the roasting circuit or to pressure leaching from the pregnant leach liquor that carries large amounts of ferrous and zinc sulfates. The pregnant liquor then is contacted with an organic phase containing an ion-exchange reagent, which may be an organic acid phosphate, e.g. D2EHPA (di-2-ethyl-hexyl phosphoric acid) or other suitable extractant, at a pH of from about 1.5 to about 4.5, whereby the pH of the contacting step is maintained at the above range throughout the extraction process using a suitable neutralizer such as off-spec zinc oxide and under total exclusion of air. Special care must be exercised here to reduce all of the $Fe^{3+}$ to $Fe^{2+}$ prior to solvent extraction to prevent iron +3 extraction preferentially over zinc. The organic phase bearing the zinc values then is contacted with an inorganic mineral acid strip solution, e.g. $H_2SO_4$, thereby stripping the zinc values from the organic phase into the strip solution for further processing, such as purification plus electrolysis.

Because of the absence of ferric ion in the leach liquor emanating from the leaching step, it is possible to effect a very good separation of high selectivity between the ferrous iron and the zinc, rendering the above extractant more highly preferential for zinc to the exclusion of ferrous iron.

The processes of the present invention affords very acceptable answers and solutions to what has been a long-standing problem, namely how to avoid zinc ferrite, how to avoid zinc sulfate, how to control the iron and particularly, how to recover the zinc economically from a zinc concentrate.

The processes of the present invention as described also make possible improved overall extractions of zinc compared to 'dead' calcine leach processes as presently practised and yet at substantially lower cost.

While the efficiency of this process derives both from being processes geared to a partial desulfurization roasting step capable of producing a partially-desulfurized zinc concentrate containing the iron substantially wholly in its ferrous state and in a very reactive form to allow its control in hydrometallurgy, and particularly from being processes capable of allowing oxide-sulfide mineral treatment to be readily combined, therefore enabling the conservation of the undigested zinc sulfide residue which is either returned to the roaster circuit or pressure leached to effect a zinc recovery that may well exceed 98%, the effectiveness of the processes described resides in their being flexible enough to be easily and economically integrated into commercial available zinc electrolytic plants. Furthermore, the process of the present invention may also make possible the design of zinc plants that give enhanced economic return from elegantly simple process designs. Such an improvement in the extraction efficiency of zinc from its concentrate by the partial roast—$H_2SO_4$ leach processes described herein which can be effected at substantially lower cost is of considerable economic importance. It will suffice to say that this technology certainly opens the door for processing many zinc ores lower in grade that have eluded economic processing options of the past.

In summary of this disclosure, the processes of the present invention provides an improved method of recovering zinc values from zinc-bearing ores or concentrates by leaching partially-roasted ores or concentrates with dilute sulphuric acid or spent zinc electrolyte. Modifications are possible within the scope of this invention.

The sulfuric acid treatment of partially desulfurized zinc concentrate in accordance with the present invention is illustrated by the following examples. These examples and tables are supportive of the processes disclosed above and illustrate the efficiency and selectivity of the removal of zinc and iron either sequentially or simultaneously from said concentrate. They are not to be construed as limiting the invention to the conditions used therein. It is obviously well within the spirit, scope and intent of this invention to vary conditions such as pH, temperatures and processing times slightly or to use these processes in connection with various other purification steps well known in the art.

EXAMPLE 1

A −60 mesh, 170.9 g sample of partially desulfurized zinc KCCA concentrate was leached at about 90° C. for 80 min. with 500 cc of 121 g/L sulfuric acid. Throughout the leach, the sulfuric acid concentration was maintained at from 30 to 45 g/L by continual addition of 76 cc concentrated $H_2SO_4$. The partially desulfurized zinc concentrated used in the leach typically contained 63.9 wt% Zn, 10.4 wt% $Fe_t$, 9.42 wt% Fe(II) and 8.5 wt% S. Treatment of the above feed material with the above dilute sulfuric acid resulted in the production of a solution and a residual leach product. During leaching, samples were withdrawn at timed intervals and filtered. Analyses of the solutions and residual leach products obtained as well as leaching results are contained in Table 1.

TABLE 1

Dilute $H_2SO_4$ Leaching of Partially Desulfurized Zinc Concentrate Containing 8.5 wt % S

| | Time min | Temp °C. | Solution Composition (g/L) | | | | Feed/Residue Composition (wt %) | | | | Zn/S Ratio in Residue | Metal Extraction (%) | |
|---|---|---|---|---|---|---|---|---|---|---|---|---|---|
| | | | $H_2SO_4$ | Zn | $Fe_t$ | FeII | Zn | $Fe_t$ | FeII | S | | Zn | Fe |
| Dilute Acid | 0 | 70 | 121 | — | — | — | 63.9 | 10.4 | 9.42 | 8.5 | | | |
| Leaching | 20 | 85 | 31 | 137 | 23.8 | — | 47.6 | 8.39 | — | 21.6 | 1.47 | 62 | 67 |
| | 40 | 90 | 45 | 156 | 35.8 | 36.3 | 43.5 | 2.14 | — | 27.8 | 0.76 | 66 | 93 |
| | 60 | 92 | 43 | 155 | 36.9 | 38.0 | 45.0 | 1.66 | — | 28.6 | 0.77 | 67 | 94 |
| Pre | 80 | 91 | 40 | 139 | 33.2 | 30.0 | 44.1 | 1.51 | — | 28.8 | 0.75 | — | — |
| Neutralization | 130 | 90 | pH = 4.2 | 159 | 30.6 | 30.7 | 48.3 | 6.36 | 6.1 | 27.6 | 0.85 | 73 | 87 |

The pulp containing most of its dissolved iron in the ferrous state was further subjected to a preneutralization step prior to solid/liquid separation. Because the iron is in the ferrous state, hydrolysis could not take place until most of the free acid has been neutralized. The preneutralization of the solution was carried out at 90° C. and over a period of 50 min during which some 43.7 g partially desulfurized zinc concentrate has been added slowly and continually to maximize the dissolution of zinc and to bring the solution pH to about 4.2. The final residue assayed 48.3 wt% Zn, 6.36 wt% $Fe_t$ mostly in the ferrous state and 27.6 wt% S. The final solution after filtration contained 159 g/L zinc and 30.6 g/L Fe with the latter being mostly in the ferrous state.

Table 1 also illustrates variations of solution and residue composition during the leach as described in the above example. An analysis of the residues and solutions obtained from this leaching shows a 95% extraction of iron and a 65% extraction of zinc after an 80 minute leach, indicating that iron in the partially desulfurized concentrate is not in the ferrite form but in a very leachable form. The results also show that all of the acid leachable zinc is extracted during the first 10 to 20 minutes of the leach after which 'steady state' zinc recovery is established. It should also be noted that while zinc dissolution practically levelled off after 20 min., iron dissolution continued at a considerable rate during the whole leach time interval thus indicating iron is not chemically tied up to the zinc as ferrite.

EXAMPLE 2

A quantity of partially desulfurized KCCA zinc concentrate of the following composition was ground to form a finely divided product consisting largely of particles small enough to pass a 100 mesh screen, and the finely divided, partially desulfurized product was leached with an aqueous solution of sulfuric acid containing 121 g/L in three stages.

| Analysis of the Partially Desulfurized Zinc Concentrate | |
|---|---|
| Zn | 62.80 wt % |
| $Fe_t$ | 9.97 wt % |
| Fe(II) | 9.93 wt % |
| S | 17.4 wt % |

The first and second stages were maintained at a temperature of about 90° C., the third at 95° C. The first stage performed for 10 min. at pH 1.4 was designed to dissolve most of the free zinc oxide while the second leach was maintained at pH 2.7 for 50 min. During the first 60 minutes, 256 g leaching material was added continually. More partially desulfurized concentrate (138 g) is continually added in the third stage that lasted 60 min. to bring the pH to about 4.4.

The solution now containing most of its small amount of dissolved iron in the ferrous stage was further subjected to an oxidation stage using a 3% $H_2O_2$ solution. The pH was maintained at 4.4 by continual addition of 45 g partially desulfurized zinc concentrate. At the completion of this stage the solution was separated from the leach residue and the latter about 83.6 g was further subjected to a diluted acid leach at a temperature of 90° C. for 80 minutes to dissolve the iron preferentially over the zinc. Throughout the dilute acid leach the sulfuric acid concentration was maintained at from 30 to 40 g/L. The analyses of the solutions and leach residues obtained from the above leach process plus results are contained in Table 2.

TABLE 2

Staged $H_2SO_4$ Leaching of Partially Desulfurized KCCA Zinc Concentrate Containing 17.4 wt % S

| | Time Min | Temp °C. | pH | Solution Composition (g/L) | | | | Feed/Residue Composition (wt %) | | | | Zn/S Ratio in Residue | Metal Extraction (%) | |
|---|---|---|---|---|---|---|---|---|---|---|---|---|---|---|
| | | | | $H_2SO_4$ | Zn | $Fe_t$ | FeII | Zn | $Fe_t$ | FeII | S | | Zn | Fe |
| Neutral | 0 | 61 | 0.1 | 121 | — | — | — | 62.8 | 9.97 | 9.93 | 17.4 | | | |
| Acid | 60 | 86 | 2.7 | — | — | — | — | | | | | | | |
| Leaching | 120 | 95 | 4.4 | — | — | — | — | | | | | | | |
| Oxidation | 170 | 95 | 4.5 | — | 93 | 0.05 | — | 56.7 | 11.6 | — | 29.7 | 0.93 | 24 | — |
| Dilute | 0 | 90 | 0.8 | 19 | — | — | — | 56.7 | 11.6 | | | | | |
| Acid | 20 | 88 | 0.89 | 40 | 22.1 | 15.4 | 12.3 | 58.3 | 2.12 | — | 29.7 | 0.96 | 27 | 91 |
| Leaching | 80 | 90 | 0.74 | 30 | 216 | 18.2 | 16.5 | 59.6 | 1.23 | 1.18 | 35.0 | 0.94 | 26 | 93 |

As shown, iron in the partially desulfurized concentrate containing some 17.4 wt% S is present substantially wholly in +2 state. The leach residue obtained from the neutral acid leach assayed 56.7 wt% Zn, 11.6 wt% $Fe_t$ and some 29.7 wt% S.

The solution obtained from the neutral leach stage contained 93 g/L zinc and some 0.05 g/L Fe. The overall zinc extraction of this stage was some 24%. An analysis of the residue obtained from the dilute leach shows a 93% extraction of iron and 26% extraction of zinc to produce a leach residue for recycle containing only 1.23 wt% Fe and as much as 59.6 wt% Zn. It should be noted that the dissolution of iron from the leach residue containing a high level of sulfur is carried out at a substantial rate, extracting some 91% of the iron from the leach residue within the first 20 minutes into the leach.

While preferred embodiments have been described and illustrated herein, the person skilled in the art will appreciate that changes and modifications may be made therein without departing from the spirit and scope of this invention as defined in the appended claims.

What we claim is:

1. A process for the treatment of an iron-containing zinc sulfide material in the form of an ore or concentrate, which comprises:
   contacting said iron-containing zinc sulfide material with an oxidizing gas at a temperature below the sintering temperature of said material to remove up to about 60 percent of sulfur-sulfide in said material and thereby to form a partially-desulfurized zinc-bearing sulfide material containing zinc oxide, ferrous iron oxide and unconverted zinc sulfide,
   selectively leaching said material with a sulfuric acid-containing solution at a temperature of about 80° C. up to the boiling point of the solution to dissolve thereby preferentially said zinc oxide over said ferrous iron oxide and said unconverted zinc sulfide to provide a first leach solution and a first leach residue containing said ferrous iron oxide and said unconverted zinc sulfide,
   selectively leaching said first leach residue with sulfuric acid at a temperature of at least about 70° to dissolve thereby preferentially said ferrous iron oxide over said unconverted zinc sulfide to provide a second leach solution and a second leach residue containing said unconverted zinc sulfide, and
   recycling said unconverted zinc sulfide to said contacting step.

2. A process of claim 1 wherein said sulfuric acid containing solution is selected from the group consisting of a zinc electrolyte and an aqueous solution of sulfuric acid.

3. A process of claim 2 wherein said first-mentioned leaching step comprises a concentration of selected acid containing solution to provide said first leach solution at a pH in the range of about 4 to 5.

4. A process of claim 3 wherein said first leach solution is at an elevated temperature in the range of 80° C. to boiling point temperature of said leach solution.

5. A process of claim 1 further comprising treating a leach solution containing dissolved zinc oxide to remove elemental zinc therefrom.

6. A process of claim 5 wherein said leach solution is treated with an oxidant to oxidize dissolved ferrous iron in said leach solution to produce an electrolytic leach solution containing zinc values and metal impurities and a residue containing zinc and other non-ferrous sulfides and iron oxides in which iron is present essentially in its ferrous state.

7. A process of claim 1, wherein said second-mentioned leaching step is effected with sulfuric acid at a minimum temperature of 70° C. while maintaining the acid concentration in the range from 10 to 60 g/L.

8. A process of claim 7 further comprising treating said second leach liquor to precipitate the iron as goethite and leave a liquid phase.

9. A process of claim 8, further comprising separating said liquid phase from the precipitated goethite to provide a solution containing zinc metal values and less than 1.0 g/L of the iron derived from the iron oxide for recycle and a goethite precipitate for disposal.

10. A process of claim 7, further comprising oxidative pressure leaching the second leach residue to produce a lead-silver residue for smelting and a leach solution for recycle.

11. A process of claim 7, further comprising floating the second leach residue to separately recover more easily floated sulfides than zinc sulfide prior to said recycle of undigested zinc sulfide to said contacting step.

12. A process of claim 1 wherein said first-mentioned leaching step is carried out in a plurality of stages through which the pH is brought up slowly to the pH range from about 4.0 to 5.0.

13. A process of claim 12 wherein the initial concentration of sulfuric acid is from 60 to 250 g/L.

14. A process of claim 12 wherein the first stage is carried out at pH between 1.0 and 2.0 for no more than 5 to 10 min.

15. A process for the treatment of an iron-containing zinc sulfide material in the form of an ore or concentrate, which comprises:
   contacting said iron-containing zinc sulfide material at a temperature below the sintering temperature of said material with an oxidizing gas to remove between 60 to 77 percent of sulfide-sulfur in said material and thereby to form a partially-desulfurized zinc-bearing sulfide material containing zinc oxide, ferrous iron oxide and unconverted zinc sulfide,
   leaching said partially-desulfurized material with a sulfuric acid-containing solution at a concentration in the range of 10 to 100 gm of $H_2SO_4$ per liter to dissolve therefrom said zinc oxide and said ferrous iron oxide simultaneously in preference to said unconverted zinc sulfide to form a leach pulp comprising a leach liquor and a residue containing said unconverted zinc sulfide, and
   recycling said unconverted zinc sulfide to said contacting step.

16. A process of claim 15 wherein said concentration of sulfuric acid in said acid containing solution is 10 to 40 gm/liter.

17. A process of claim 16 wherein said acid containing solution is selected from the group consisting of a zinc electrolyte and an aqueous solution of sulfuric acid.

18. A process of claim 15 wherein said leach pulp is neutralized with partially desulfurized zinc concentrate, and then is filtered to produce (1) a leach liquor containing zinc and appreciable amounts of iron derived from the partially desulfurized zinc concentrate and having an acid concentration of 10 to 40 g/L and (2) a leach residue containing zinc, other non-ferrous sulfide and iron values in which iron is present primarily in its ferrous state.

19. A process of claim 18 further comprising oxidizing the iron present in its ferrous state in said leach liquor to geothite at elevated temperature of at least 80° C. with concomitant neutralization to a pH not less than 2.0.

20. A process of claim 19 further comprising separating the liquid from the precipitated goethite to produce a solution containing zinc metal values and less than 1.0 g/L of the iron derived from the iron oxide for further purification and electrolysis, and a goethite precipitate for disposal or further treatment to recover the entrained zinc as zinc sulfide from the precipitated iron for re-use.

21. A process of claim 18 further comprising oxidative pressure leaching said leach residue to produce a lead-silver residue for further smelting and a leach solution for recycle.

22. A process of claim 18 further comprising floating said leach residue to separately recover the sulfides more easily floated than zinc sulfide, prior to said recycle of unconverted zinc sulfide to the contacting step.

23. A process of claim 18 wherein said leach liquor is contacted with an organic phase containing an ion-exchange reagent at a pH of from 1.5 to 4.5 to produce (1) an organic phase bearing the zinc values which is then contacted with an inorganic mineral acid strip solution, and (2) a raffinate bearing mostly the iron values as ferrous sulfate.

24. A process of claim 23 wherein said ion-exchange reagent is an organic acid phosphate.

25. A process of claim 24 wherein said organic acid phosphate is di-2-ethyl-hexyl phosphoric acid.

26. A process of claim 15 wherein the leach temperature of the leaching step is between 70° C. and the boiling point of the solution.

27. A process of claim 8 wherein the temperature of the goethite precipitation step is between 80° C. and the boiling temperature.

28. A process of claim 19 wherein the temperature of the goethite precipitation step is between 80° C. and the boiling temperature.

29. A process of claim 8 wherein the precipitation of the remaining ferrous iron following the goethite precipitation is accomplished by neutralizing the remaining acid in solution concomitantly with oxidation of the ferrous iron to ferric.

30. A process of claim 19 wherein the precipitation of the remaining ferrous iron following the goethite precipitation is accomplished by neutralizing the remaining acid in solution concomitantly with oxidation of the ferrous iron to ferric.

31. A process of claim 29 wherein said neutralization is effected by adding a basic substance solution is calcine, partially desulfurized concentrate, off-spec zinc oxide or sodium hydroxide.

32. A process of claim 6 wherein the oxidant is air, oxygen gas or hydrogen peroxide.

33. A process of claim 19 wherein the oxidant is air, hydrogen peroxide.

34. A process of claim 6 wherein the temperature of the oxidizing step is between 50° C. and the boiling temperature.

35. A process of claim 19 wherein the temperature of the oxidizing step is between 50° C. and the boiling temperature.

36. A process of claim 15 wherein the concentration of sulfuric acid in said acid containing solution is maintained between 10 to 30 g/L.

* * * * *